Nov. 18, 1969  R. R. MAURYA ET AL  3,478,410
FRICTION WELDING
Filed Oct. 21, 1966  3 Sheets-Sheet 1
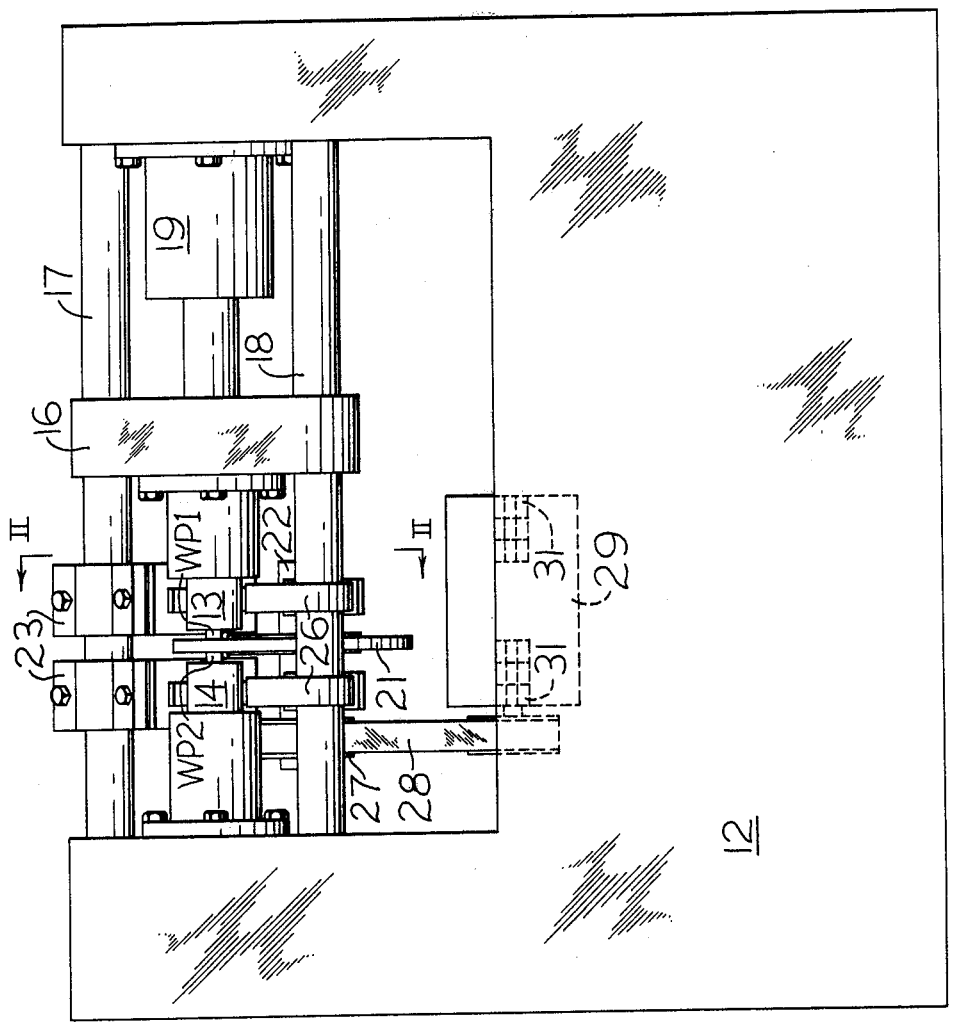
INVENTORS
RAMAMURAT R. MAURYA
JOSEPH HARRINGTON, JR.
EDWARD R. SQUIBB, III
BY
Fryer, Tjensvold, Feix & Phillips
ATTORNEYS

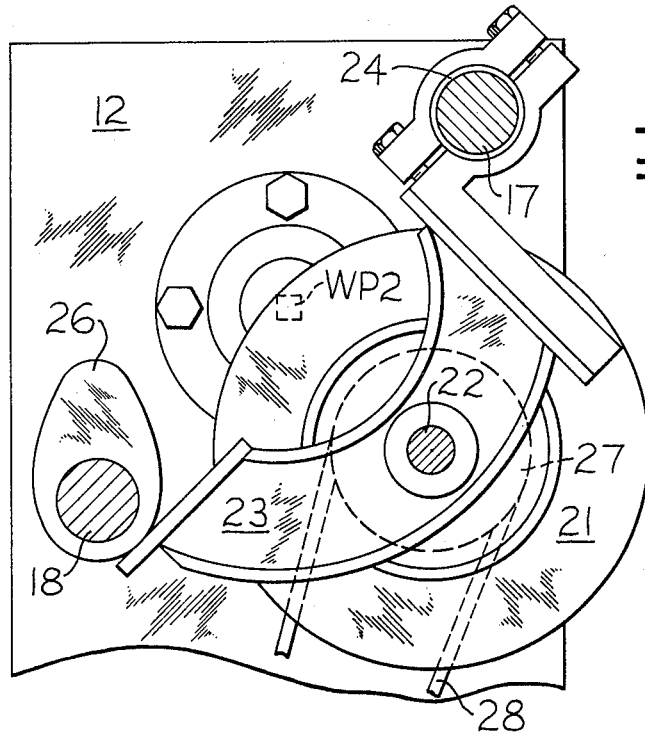
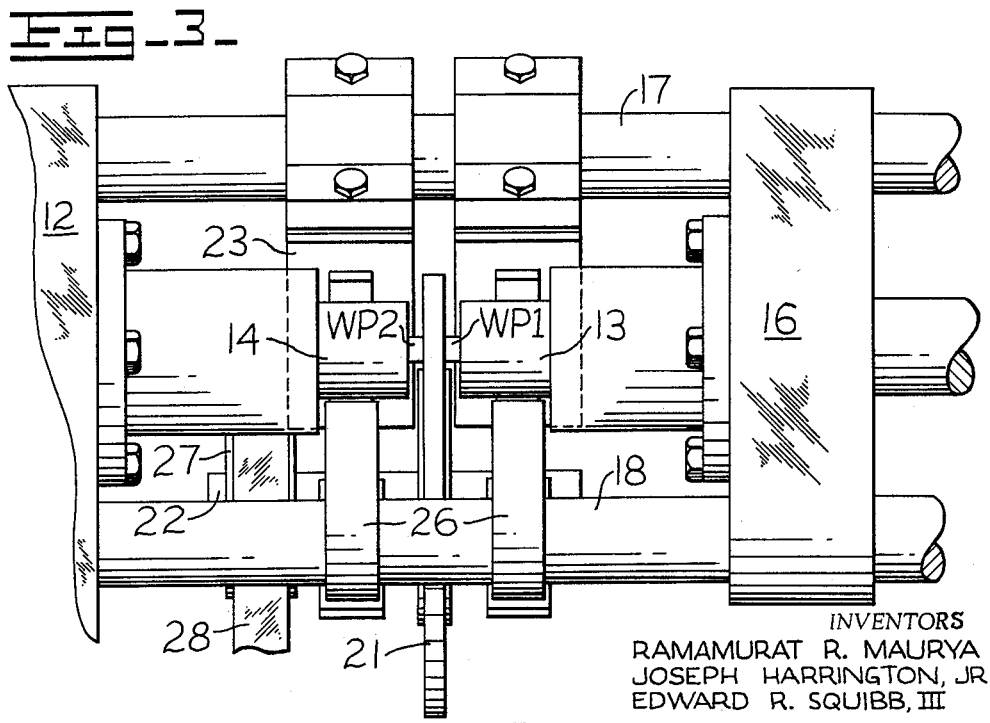

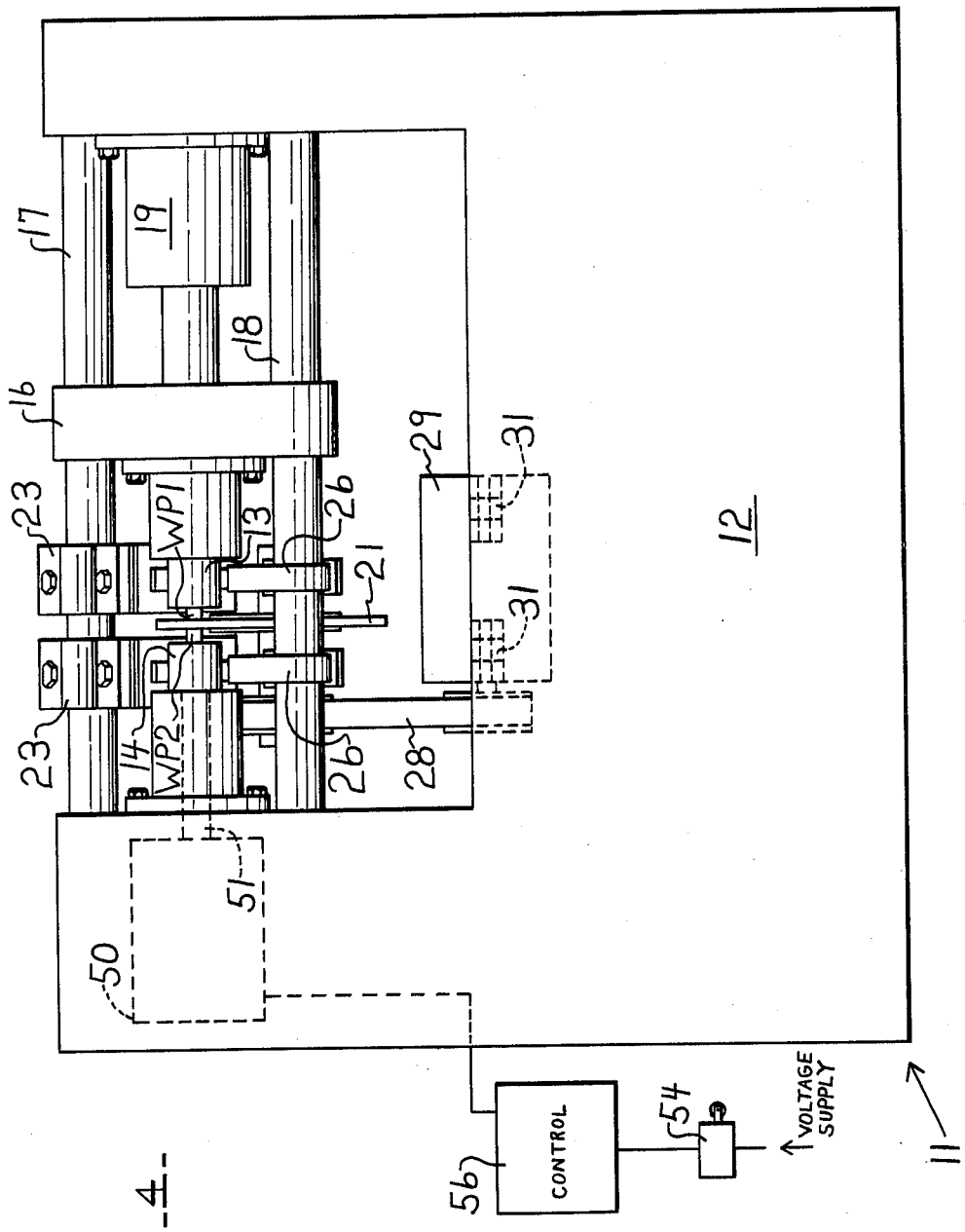

3,478,410
FRICTION WELDING
Ramamurat R. Maurya, Peoria, Ill., and Joseph Harrington, Jr., Wenham, and Edward R. Squibb III, Harvard, Mass., assignors, by direct and mesne assignments, to Caterpillar Tractor Co., Peoria, Ill., a corporation of California
Continuation-in-part of application Ser. No. 516,313, Dec. 27, 1965. This application Oct. 21, 1966, Ser. No. 595,289
Int. Cl. B23k 27/00
U.S. Cl. 29—470.3          7 Claims

ABSTRACT OF THE DISCLOSURE

A method and apparatus for friction welding two metal workpieces axially arranged in spaced apart relation with their facing surfaces engaged in rubbing contact with a frictional heating member for a sufficient time and under sufficient pressure to heat the facing surfaces to a plastic bondable condition. The heating member is thereafter withdrawn and the facing surfaces are pressed together with sufficient force to bond the parts while relatively moving the engaged parts to produce heavy plastic working and forging of the engaged surfaces.

---

This application is a continuation-in-part of U.S. application Ser. No. 516,313 filed Dec. 27, 1965 and now abandoned.

This invention relates to a method and apparatus for bonding two parts by frictional heating of the surfaces to be bonded. More specifically, this invention relates to a method and apparatus wherein a heating member is engaged in rubbing contact with axially spaced apart and facing end surfaces of the parts to heat the facing surfaces to a plastic, bondable condition. The heating member is then withdrawn as the heated surfaces are pressed together to form the bond.

A great deal of interest and activity have recently developed in friction heating techniques following the publication of Russian and Czechoslovakian articles in 1957 and 1958. V. I. Vill' wrote a number of Russian language articles describing a process in which end surfaces of bars or tubes are pressed together and rotated relative to one another to heat the engaged ends by the friction produced. After the parts are heated long enough the relative rotation is stopped and forging pressure is applied to bond the parts across the engaged ends.

V. I. Vill' describes a preheating technique which may be used in conjunction with the friction welding process when one part is softer than the other. In this preheating technique the harder part is rotated against an auxiliary plate to preheat the harder part prior to engagement with the softer part. The plate is then removed and the friction weld process as described above is started with some degree of preheat in the harder member to reduce flashing of the softer, cooler part.

The rotational technique described in the Russian and Czechoslovakian articles has limitations. It is limited to parts of fairly regular cross section and cannot maintain angular orientation of the parts. These limitations of the method have imposed important restrictions on the application of the method.

V. I. Vill' also described a technique in which an intermediate part is positioned between the axially spaced ends of the two bars or tubes. In this technique the intermediate part is rotated against the bars or tubes, which are held stationary. The use of such an intermediate part does permit the angular orientation of the end pieces to be maintained. However, parts of irregular cross section cannot be bonded together with an intermediate part of the same cross section. The irregular cross sections cannot be adequately heated by rotation, and the intermediate part cannot be angularly oriented at the conclusion of the bonding operation.

Even with parts of fairly regular cross section, the problem of angular orientation of the intermediate piece can be critical. For example, it may be necessary to bond parts of hexagonal cross section so that all flats and all corners are in alignment through the length of the bonded article.

In some cases the increase in axial length produced by the addition of the intermediate piece can be undesirable or unacceptable.

It is a primary object of the present invention to bond two parts by a friction heating method that maintains precise angular orientation and axial alignment of the parts.

In accordance with the present invention the two parts to be bonded are held in a position in which an end surface of one part faces and is axially spaced from an end surface of the other part. A heating member is placed between the facing end surfaces and is moved in rubbing contact with the surfaces under sufficient pressure and for a sufficient time to heat the surfaces to a plastic, bondable condition. The heating member is then withdrawn from the space between the two parts and these two parts are quickly pressed together under sufficient force to bond the heated end surfaces together. This method and a machine for performing this method constitute further specific objects of the present invention.

In many cases it is desirable to produce some plastic working at the engaged surfaces after the parts have been pressed together following withdrawal of the heating member. A limited amount of low speed plastic working at this time acts to forge the bond zone. The forging action helps remove impurities from the interface, by squeezing the impurities out into the flash, and also acts to compact the bond zone. In one form of the present invention the plastic working may be accomplished by turning one part through about two revolutions with respect to the other part after the parts have been pressed together. In other forms of the invention the parts may be oscillated or reciprocated after being pressed together. The type of plastic working will depend on the configuration of the parts.

Other and further objects the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a front elevation view of a machine constructed in accordance with one embodiment of the present invention;

FIG. 2 is a fragmentary end elevation view taken along the line and in the direction indicated by the arrows 2—2 in FIG. 1;

FIG. 3 is a fragmentary enlarged view of the portion of the machine shown encircled by the arrows 3—3 in FIG. 1; and FIG. 4 is a front elevation view like FIG. 1 showing a machine constructed in accordance with another embodiment of the present invention and having a controlled drive for producing plastic working at low speed after the parts have been engaged.

In FIG. 1 a machine constructed in accordance with one embodiment of the invention is indicated generally by the reference numeral 11.

The machine 11 includes a frame 12 and two chucks 13 and 14 for holding in the parts or workpieces WP1 and WP2 to be bonded. The chuck 14 is mounted directly on the frame 12. The chuck 13 is mounted on a cross head 16, which is in turn mounted for sliding movement on tie bars 17 and 18.

Axial movement of the cross head 16 along the tie bars 17 and 18 is produced by an air cylinder 19.

A heating member 21 is positioned between the facing end surfaces of the workpieces WP1 and WP2. As illustrated in the drawings the heating member 21 is in the form of a disc and is mounted on a shaft 22 journaled for rotation in bearing mounts in a pair of swing arms 23. Each swing arm 23 is in turn pivotal about the tie rod 17 on a bearing 24.

As illustrated in FIG. 2, each swing arm 23 is controlled by the cam 26. With the cam 26 in position shown in FIG. 2 the swing arms are biased, by means not shown, to a position in which the heating member 21 is disposed between the facing end surfaces of the workpieces WP1 and WP2. When the cams 26 are rotated about 90° from the position shown in FIG. 2 the lobe of the cam moves the swing arms 23 about the axis of the tie bar 17 to positions in which the heating member 21 is withdrawn from the space between the facing end surfaces of the workpieces WP1 and WP2.

A pulley 27 and belt 28 form a drive connection between the heating member 21 and a motor 29. The motor 29 is mounted for rotation about pivots 31 to permit swinging movement of the pulley 27 when the heating member 21 is to be withdrawn from between the workpieces.

In the operation of the machine 11 the air cylinder 19 presses the workpieces against the sides of the heating member 21 with sufficient force to cause the surfaces of the workpieces to be heated to a plastic condition as the motor 29 rotates the heating member 21 between the workpieces. After the faces of the workpieces have been heated to this condition the heating member 21 is quickly withdrawn from between the workpieces and the air cylinder 19 moves the cross head 16 and chuck 13 forward (to the left as viewed in FIG. 1) to engage the heated surfaces of the workpieces. The air cylinder 19 applies sufficient load to bond the workpieces across these engaged surfaces.

While the heating member 21 has been shown as a rotatable disc in the drawings, a reciprocable member may also be used.

In many cases it is desirable to produce some plastic working of the engaged surfaces after the workpieces have been pressed together following withdrawal of the heating member. Plastic working at low speed forges the bond zone and helps to flash out impurities, such as oxides, formed on the heated faces of the member being welded.

An embodiment of the invention which incorporates means for producing such low speed working is illustrated in FIG. 4. The machine 11 illustrated in FIG. 4 is like the machine 11 illustrated in FIG. 1 except for the addition of the means for producing low speed working after the workpieces WP1 and WP2 have been engaged following withdrawal of the heating member 21.

In the form of the invention illustrated in FIG. 4 the means for producing the low speed working comprise a motor 50 connected by a shaft 51 to the chuck 14.

A limit switch 54 senses the position of the heating member 21 and energizes a control 56 to rotate the motor 50, and the chuck 14, the desired number of revolutions after the workpieces have been engaged with one another.

The purpose of the relative rotation between the parts at this time is not to produce frictional heating (as in the conventional friction welding process) by sliding contact of one part with the other. Instead, the purpose is to twist the connected parts, through the plastic bond zone, and in so doing extrude the hottest and most plastic material (which will exist at the juncture between the workpieces) radially outward as flash.

It has been found that about two revolutions at low speed are quite effective to produce the desired plastic working, or squeezing, of the hot plastic material in the bond zone.

In many case it may also be desirable to increase the pressure with which the workpieces are engaged after the heating member 21 has been withdrawn. The reasons for this are twofold. First, working at a lower pressure when the workpieces are engaged with the heating member 21 minimizes problems of galling of the engaged surfaces of the workpieces and the heating member and also minimizes stalling of the drive. Secondly, increasing the pressure at the time the workpieces are directly engaged helps to compact the bond zone and to remove impurities from the interface as flash.

The low speed working by the motor 50 may be done before application of an increased upset load or may be done simultaneous with the application of an increased upset load.

An alternate mode of operation for the machine shown in FIG. 4 is to energize motor 50 to produce slow rotation of the workpiece WP2 on the heating member 21 during the time that the workpiece is in contact with the heating member and to continue such rotation of the workpiece WP2 after the heating member has been withdrawn for a predetermined interval of time or number of revolutions.

In some cases, depending primarily on the configuration of the parts being bonded, it may not be feasible to produce rotation of one of the workpieces. In such cases the motor 50 may be connected to produce oscillation or reciprocating movement of the workpiece WP2 to provide the low speed plastic working after the workpieces have been directly engaged.

It has also been found desirable to use an inert gas to shield the workpieces during the bonding process. Argon gas directed to the heated surfaces through a nozzle in the shape of an expanding cone has been found quite effective. The argon gas shields the heated surfaces from oxygen.

The following conditions are given as an example of process parameters which have produced full strength bonds between typical metal workpieces such as SAE 1020 and 302 steel bars in an argon gas atmosphere. A 10.5 inch diameter steel disc was rotated at 2,700 r.p.m. to produce a surface velocity of at least 80 feet per second and preferably of 120 feet per second at the contact surfaces of the workpieces. The preheating pressure was in a range generally of 700 to 2,000 p.s.i. and preferably a range of 750 p.s.i. to 1630 p.s.i. and the forging pressure was increased to the range between 11,000 p.s.i. and 17,000 p.s.i. after the disc was withdrawn. These conditions are given only by way of example and are not to be considered as limitations. For example, substantially higher heating pressures can be used if there is sufficient drive torque for rotating the heating member.

Photographs of the microstructures in the region of the joint show grain refinement and show that the bond zone was very narrow. Photographs of the microstructure of the 302 steel workpieces noted above also show that the bond zone contained some low temperature deformation products. The grain size in the bond zone of the 302 steel was unusually small and was changed in structure. Some carbide precipitation and some oxide inclusions were also apparent in the photographs of the microstructure of the 302 steel.

While we have illustrated and described the preferred embodiment of our invention, it is to be understood that these are capable of variation and modification, and we therefore do not wish to be limited to the precise details set forth, but desire to avail ourselves of such changes and alterations as fall within the purview of the following claims.

We claim:
1. A method of bonding two metal parts, comprising, holding the parts in a position in which an end surface of one part faces and is axially spaced from an end surface of the other part, engaging a frictional heating member in rubbing contact with the facing surfaces of the parts and continuing the rubbing engagement for a sufficient time and under sufficient pressure to heat the facing surfaces to a plastic bondable condition, withdrawing the heating member after the facing surfaces have been heated to a plastic bondable condition, quickly pressing the facing surfaces together with sufficient force to bond the parts after the heating member has been withdrawn and moving the engaged parts relative to one another at low speed a limited amount sufficient to produce heavy plastic working and forging of the engaged surfaces after the heating member has been withdrawn, wherein the heating member is a disc and is rotated to produce the rubbing engagement and wherein the parts are rotated about two turns after being engaged.

2. A method as defined in claim 1 wherein the axial load on one part is increased after the engaged parts have been rotated to produce an increased upset pressure.

3. A method as defined in claim 2 wherein an inert gas is used to shield the surfaces of the parts heated by the disc.

4. A method as defined in claim 3 wherein the parts are steel, the rotating disc engages the parts with a surface velocity of at least 80 feet per second, the parts are pressed against the disc with a contact pressure in the range of 700 to 2000 pounds per square inch and the parts are pressed together with an upset pressure at the interface between the parts in the range of 11,000 to 17,000 pounds per square inch.

5. A machine for bonding two metal parts and comprising, positioning means for holding the parts in a position in which an end surface of one part faces and is axially spaced from an end surface of the other part, a frictional heating member and actuating means for moving the heating member in rubbing contact with the facing surfaces, loading means for maintaining sufficient pressure of engagement between the heating member and the facing surfaces to cause the rubbing engagement to heat the surfaces to a plastic, bondable condition, means for withdrawing the heating member from the space between the facing surfaces, said loading means being operable to press the facing surfaces together with sufficient force to bond the parts after the heating member has been withdrawn, working means for moving the parts relative to one another a limited amount at low speed after the heating member has been withdrawn to thereby produce heavy plastic working and forging of the engaged surfaces and control means for controlling the amount of low speed working, wherein the heating member is a disc and the actuating means rotate the disc.

6. A machine as defined in claim 5 wherein the working means comprise a motor and drive connection to one part effective to rotate that part with respect to the other part and wherein the control means limit the relative rotation of the engaged parts to about two revolutions.

7. A machine as defined in claim 5 wherein the working means comprise a motor connected to rotate one part at low speed with respect to both the disc and the other part and wherein the control means stop the rotation with respect to the other part within about two revolutions after the parts have been engaged following withdrawal of the disc.

References Cited
UNITED STATES PATENTS

| | | | |
|---|---|---|---|
| 3,013,925 | 12/1961 | Larsen | 156—306 XR |
| 2,169,315 | 8/1939 | Yngve | 156—73 |
| 2,956,611 | 10/1960 | Jendrisak et al. | 156—73 |
| 3,058,513 | 10/1962 | Schaub et al. | 156—73 XR |
| 3,134,169 | 5/1964 | Hollander et al. | 29—470.3 |
| 3,234,642 | 2/1966 | Hollander | 29—498 |
| 3,273,233 | 9/1966 | Oberle et al. | 29—470.3 |

JOHN F. CAMPBELL, Primary Examiner

U.S. Cl. X.R.

29—494, 498; 228—2